Aug. 9, 1955  W. C. LAPPLE ET AL  2,715,018
RECOVERY OF HEAT FROM FINELY-DIVIDED SOLIDS
Filed Dec. 20, 1951
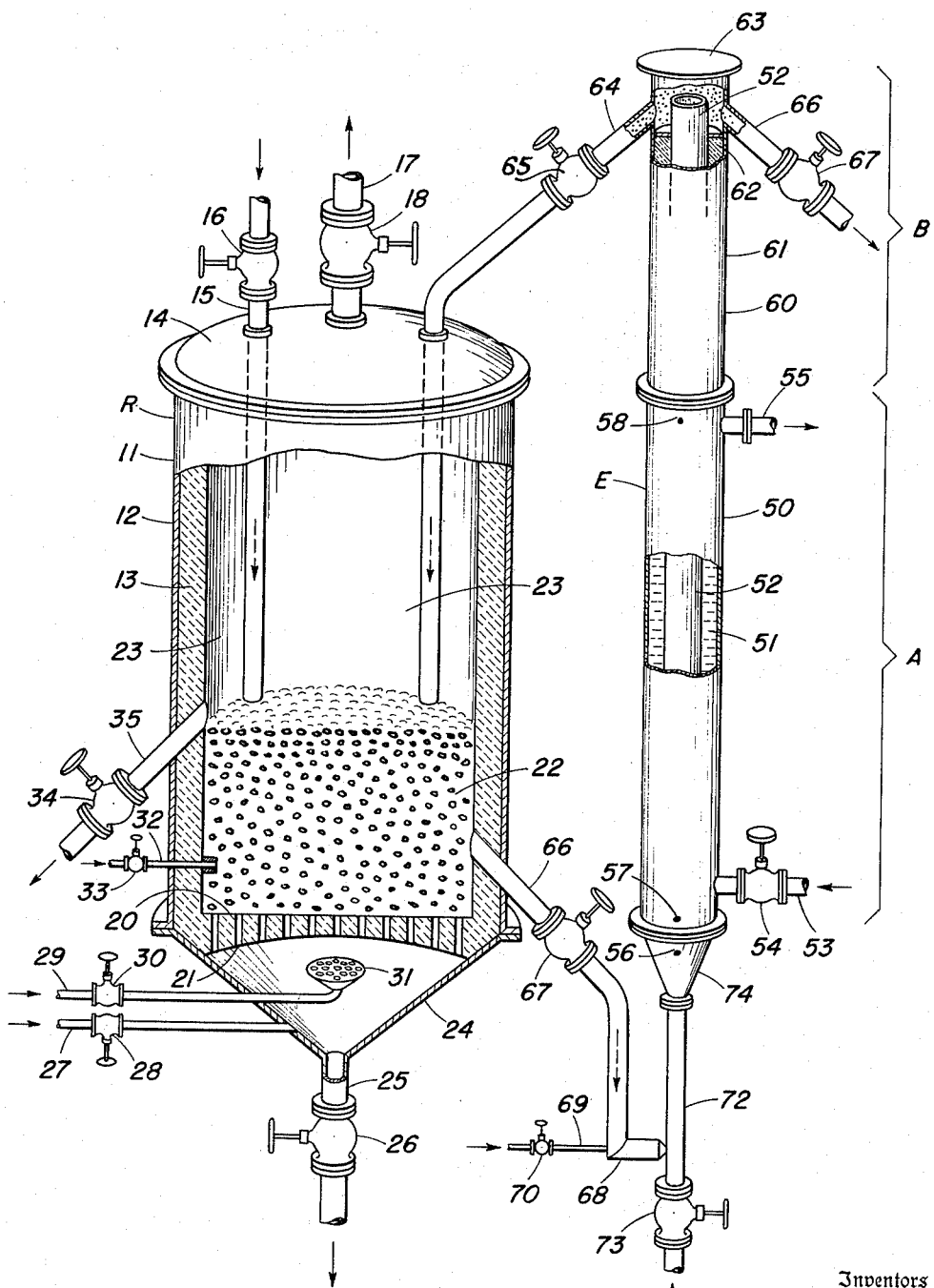
Inventors
Walter C. Lapple
Hermann W. Behme
William J. Fox
Attorney

United States Patent Office 2,715,018
Patented Aug. 9, 1955

2,715,018

RECOVERY OF HEAT FROM FINELY-DIVIDED SOLIDS

Walter C. Lapple, Kansas City, Mo., and Hermann W. Behme, Norwalk, Conn., assignors to The Dorr Company, Stamford, Conn., a corporation of Delaware Application December 20, 1951, Serial No. 262,595

3 Claims. (Cl. 257—55)

This invention relates generally to the recovery of sensible heat from hot gases and solids. More particularly, it relates to improved ways and means for recovering sensible heat from hot finely-divided solids suspended in an uprising carrier-gas stream.

Throughout this specification the term "solids concentration" refers to the weight of solids per unit volume of gas-solids suspension, while "rate" of solids flow refers to the weight of solids transferred per unit of time.

It is known to suspend hot finely-divided solids in an uprising stream of carrier gas and then to pass such suspension upwardly through heat exchange apparatus wherein heat is transferred from the solids to a surrounding coolant medium thereby to recover the transferred heat as super-heated steam or the like. The cooled solids thus obtained may also be utilized as temperature control means in certain instances, such as in fluidized solids reactors, by the expedient of recycling such cooled solids into the reactor to depress temperatures therein and thus maintain the reactor temperature within the desired limits.

The described prior method has been and is an efficient means for recovering sensible heat from finely-divided solids. However, such prior processes have certain inherent disadvantages. The chief disadvantages of such prior methods reside in the fact that the concentration of solids in the uprising gas stream must be maintained relatively low in order to maintain a uniform rate of passage of solids through the heat exchanger. This is so because of the solids and gas cooling taking place within the heat exchange tube. This cooling upsets the gas-solids equilibrium in the entering feed suspension thus causing considerable solids recirculation or back mixing within the heat exchanger.

The apparent effect of this internal solids recirculation is:

(1) To momentarily decrease the rate at which solids discharge from the exchanger to a rate lower than that at which solids are initially supplied to the exchanger. This is due to the fact that some solids are detained in the exchanger for internal recirculation therein;

(2) To increase abnormally the solids concentration within the heat exchanger during the period of reduced discharge rates;

(3) To then increase the solids discharge to a rate consistent with the abnormally increased solids concentration; and, since the solids discharge rate at abnormally high concentrations is considerably greater than the initial solids feed rate, the solids concentration within the heat exchanger decreases from an abnormally high value to a lower value.

The net result of this phenomena is a cyclic rate of solids passage through the heat exchanger, which fluctuates from a rate lower than the initial feed rate to a rate considerably in excess of such initial feed rate. This cyclic rate of solids throughput results in fluctuating heat exchange operation. Moreover, a cyclically functioning heat exchanger cannot be utilized as a reliable source of cooled solids for use in temperature control.

The above described cyclic disturbance becomes increasingly more troublesome as the size of the solids in the entering feed suspension becomes smaller and/or as the concentration of solids in the entering feed is increased, and this is an extremely serious limitation because it is always desirable to maintain high concentrations of fine solids within the heat exchange chamber in order to enhance the efficiency of the heat transfer process.

So it is an object of this invention to provide ways and means for maintaining a substantially constant rate of solids throughput through a vertical heat exchange chamber while maintaining in the chamber a concentration of solids in excess of that existing in the gas-solids suspension initially supplied to the chamber. It is a further object to enable the uniform passage of high concentrations of relatively finer solids than hitherto possible.

We have discovered that we can overcome this cyclic disturbance within a vertical heat exchange chamber so that we are enabled to remove cooled solids from the heat exchange system at a uniform rate substantially equal to the rate at which such solids are initially supplied to the heat exchange chamber, namely by providing a stabilizing zone of substantially uniform temperature directly above and communicating with the heat exchange chamber. In this manner there is a dampening effect exerted on the suspension in the heat exchange chamber in that, in the stabilizing zone, the gas velocities apparently stabilize and the internal solids recirculation diminishes with the result that the abnormally high solids concentration thins out to a lower value so that the rate at which solids discharge from the stabilizing zone becomes stabilized at a rate substantially equal to the rate at which solids initially enter the heat exchange chamber. This produces a more efficient and uniform overall operation of the heat exchanger in that the rate of solids throughput is maintained substantially uniform and the quantity of heat recovered per unit of time will be uniform and predictable for any given rate of solids feed to the heat exchanger. Moreover, high concentrations of fine solids may be constantly maintained within the exchanger thereby increasing its overall heat transfer efficiency.

According to this invention, the stabilizing zone above the heat exchanger proper is a vertical isothermal zone where there no longer exists a temperature gradient from wall to center and within which zone internal recirculation effects gradually diminish and the concentration thins out to a density in equilibrium with the initial solids feed rate. In other words, in the isothermal zone the suspension becomes thermally homogeneous, whereas in the cooling zone it had been thermally heterogeneous.

In this isothermal stabilizing zone the gas-solids suspension appears to stabilize so that the solids concentration diminishes to a point where solids are passing out of the zone at a rate substantially equal to the rate at which solids are initially supplied to the heat exchanger. Thus, solids throughput through the heat exchanger becomes stabilized at a constant rate and cyclic disturbance disappears due to the dampening effect of the added isothermal zone.

Summarizing, we propose to recover sensible heat from hot finely-divided solids at a uniform rate by continuously feeding such solids into a carrier gas stream to establish and maintain a suspension of such solids within such gas stream, passing such gas-solids suspension upwardly through a generally vertical heat exchange zone surrounded by coolant medium, cooling said gas-solids suspension during passage through said vertical zone, upwardly removing cooled suspended solids from the zone directly into a superjacent isothermal zone, detaining said cooled suspended solids in the isothermal zone for a time sufficient for their concentration to thin out to a lower concentration than exists in the heat exchanger zone, and discharging solids from the isothermal zone at a uniform rate substantally equal to the rate at which solids are initially supplied to the heat exchange zone.

This and possibly other objects are attained by injecting hot finely-divided solids into a carrier gas stream to obtain a solids concentration within such gas stream, passing the resulting suspension of solids upwardly through a heat exchange chamber surrounded by an ever-changing coolant medium, cooling the solids by heat transfer as they pass through the heat exchange chamber, passing cooled suspended solids upwardly out of the heat exchange chamber into a connecting and directly superjacent stabilizing chamber insulated to be substantially isothermal, detaining suspended solids within such stabilizing chamber for a time sufficient for conditions within the solids suspension to become substantially stabilized, and withdrawing solids and gases from such stabilizing chamber at a uniform rate substantially equal to the rate at which they are initially introduced into the heat exchange chamber.

An important feature of our invention resides in the fact that we are enabled to maintain relatively high concentrations of solids within the heat exchanger chamber and are thus benefited by a greater solids detention time and a consequent better heat recovery. In other words, our invention utilizes the solids concentration increase as an advantageous processing step where it had hitherto been regarded as an economic disadvantage.

The concept of this invention may be more clearly understood and readily appreciated by reference to the accompanying drawing.

The best embodiment of the invention now known to us has been selected for the purpose of illustration, but it is to be understood that it is illustrative only and not limiting for obviously changes in arrangement, construction and detail can be made without departing from the scope of the invention as defined by the appended claims bearing in mind, however, that their requirements include equivalents thereof.

The drawing shows a commercial embodiment of a preferred type of apparatus for efficient practice of the invention and depicts a heat exchange apparatus in conjunction with a fluidized solids reactor in which finely-divided solids are subjected to heat treatment.

Inasmuch as the drawing includes references to the fluidized technique for treating finely-divided solids, it will be wise to discuss the fluidized solids concept briefly before presenting a detailed description of the invention.

A fluidized solids reactor or furnace in its simplest form is a vertical vessel having a perforated horizontal partition in its lower portion. Finely-divided solids are supplied to the vessel to form a bed of such solids on the perforated partition. Gas is passed upwardly from the bottom of the vessel through the perforated partition and through the powdered finely-divided solids at such a velocity or rate that the solids are kept mobilized so as to be mixed and unstratified as a bed or layer in the vessel of gas-suspended solids. The mobilized solids are in dense, turbulent suspension and are usually referred to as a fluidized bed.

A fluidized bed is therefore a very dense suspension of mobilized fine solids suspended in an upflowing stream of gas. The density or solids concentration per unit volume of such a fluidized bed is very high, being commonly on the order of 10 to 100 pounds of solids per cubic foot of bed volume. This bed density is to be contrasted with typical dilute dispersions or suspensions, such as dusty air wherein the density of solids concentration is of the order of only $1/50$ of a pound per cubic foot of the dispersion. In addition, the solid particles of a fluidized bed are in a high state of turbulence or erratic zig-zag motion in the bed even when the suspending gas has a relatively low velocity; such high turbulence causes intimate and rapid mixing of the solid particles so that in a typcial bed complete mixing of the solids appears to take place instantaneously. A fluidized bed, because of its high density and great turbulence, is noted for the rapid transfer of heat by and among its solid particles and between its solid and gaseous components; this heat transfer is so rapid that a remarkable uniformity or homogeneity in the temperature of the bed results. This dense suspension behaves like a turbulent liquid and exhibits a fluid level so that it will flow hydrostatically just as a fluid does.

Fluidized processes are in wide use for a variety of metallurgical processes. They are particularly adapted for either exothermic or endothermic reactions. In either type of reaction, heat exchangers, for the purpose of recovering sensible heat from the solids as well as for cooling solids to be recycled for temperature control means, are desirable and sometimes necessary adjuncts. This is so because heat losses in the form of sensible heat may be excessive and, in the case of exothermic reactions, temperature control by recycling cooled solids is required to prevent such excessive temperatures within the reactor that fusion of the particles occurs with consequent cessation of fluidization. Additionally, close temperature control is frequently required in certain processes requiring narrow critical temperature limits and this control may be obtained if there is a convenient source of cooled solids being delivered at a uniform rate.

Referring now to the drawing: There is shown a reactor R which is made up of a cylinder 11 having a metal outer wall 12 and lined with refractory material 13. The reactor has a top 14 through which solids to be treated are introduced via conduit 15 which is valved as at 16. Conduit 17, valved as at 18, is provided for the purpose of allowing gases to escape from the reactor. At the bottom of the cylindrical section of the reactor is a constriction plate 20 having gas admitting apertures such as at 21. Constriction plate 20 extends throughout the cross-sectional area of the reactor and is adapted to hold thereon a fluidized bed 22 of solids undergoing treatment, above which is a free-board or dust disengaging space 23.

In the bottom of the reactor and below the constriction plate thereof there is provided a coned bottom 24 which is equipped with a cleanout conduit 25, valved as at 26. Fluidizing gas is admitted to the coned section via conduit 27, valved as at 28. Fuel for starting up may be suppiled to the coned section via conduit 29 valved as at 30 and such fuel combusted in burner 31. After the bed has been heated to fuel ignition temperature fuel may then be supplied directly to the bed via conduit 32 which is valved as at 33 and such fuel is combusted directly within the bed to furnish heat for reaction therein when such heat is necessary.

The fluid level of bed 22 is maintained substantially constant by the continuous addition of solids through conduit 15 and the continuous removal of solids from the upper surface of the bed via conduit 35, valved as at 34.

Connected with and operating in conjunction with the reactor is heat exchanger E. Heat exchanger E is made up basically of zone A, the heat exchanging zone proper; and zone B, which is the solids suspension stabilizing zone wherein the concentration of the suspended solids thins out so that the rate of solids discharged therefrom is in equilibrium with the rate at which solids are supplied to zone A.

Zone A comprises an outer jacket 50 adapted to contain a flowing coolant 51 which flowing coolant surrounds a solids transport conduit 52 for the purpose of extracting heat from the solids passing through conduit 52. A coned section 74 is provided having an inside diameter at the base equal to the inside diameter of conduit 52. Coolant material is supplied into jacket 50 via conduit 53 and the rate of supply is controlled by valve 54. Hot or vaporized coolant material is discharged from jacket 50 via conduit 55 and is sent directly to process or to storage or possibly to be recycled through jacket 50 again. Thermocouples are provided at 56, 57 and 58 for taking temperature readings of the gas-solids suspension in the riser 52.

Zone B, generally designated 60, comprises an outer jacket 61 and an inner solids transport conduit 52. Between outer wall 61 and transport conduit 52 is a layer of insulation 62. Section 60 is provided with a top 63 which is spaced above the outlet of solids transport conduit 52.

Heated solids are discharged from the reactor R via conduit 66, valved as at 67, and flow downwardly into lateral section 68. From lateral section 68 the solids are propelled by air, admitted via conduit 69 (valved as at 70) to discharge into riser 72 at a controlled rate. Carrier gas admitted into riser 72 through valve 73 picks up the solids discharged from section 68 and carries them upwardly into coned section 74 whence they continue to rise upwardly through conduit 52 of zone A where sensible heat is extracted. The solids then pass upwardly through zone B where the solids suspension becomes stabilized and its solid concentration diminishes so that solids are discharged from the top of conduit 52 thence to flow or be blown through conduit 64 (valved as at 65) to return to reactor R. If desired, cooled solids may be discharged via conduit 66 which is valved as at 67.

Within zone A of the heat exchanger there is an increase in the solids concentration of the suspension. It may be theorized that this increase is due to the sudden chilling of the solids suspension which will occur along the periphery of transport conduit 52 and that this chilling upsets the equilibrium of the uprising gas solids suspension thus causing internal recirculation within conduit 52 in zone A so that the concentration of solids therein increases considerably over that present in the incoming suspension. As this suspension of increased concentration passes upwardly into zone B a stabilizing operation apparently occurs and for some unexplained reason the concentration of solids within the suspension gradually diminishes to a point where it is substantially in equilibrium with the rate at which solids are initially supplied to zone A. That is to say, the concentration of solids in the suspension discharging from the upper end of conduit 52 is such that the rate of solids discharged therefrom is substantially equal to the rate at which solids initially enter zone A through the bottom of conduit 52. The net result then is that even though there is an increased concentration of solids within zone A, nevertheless solids are discharged from the top of zone B at a uniform rate that is substantially equal to the rate at which solids are initially supplied to zone A.

This uniform throughput of solids enables the operator to closely control the temperature within the reactor for the reason that he is able to recycle thereto cooled solids at a uniform rate. Moreover, the rate at which heat is extracted from the suspension rising through zone A is also uniform and consequently the heat is readily available for process without the requirement of having to make constant adjustments in order to bring it within prescribed temperature ranges.

The design of stabilizing zone B must be such that sufficient space is allotted for the solids concentration to thin out and for the solids discharge rate to equalize with the rate at which solids are initially supplied to heat exchanger A. This means that the design of the stabilizing zone B primarily as to length will vary in accordance with the fineness of solids being treated as well as with the concentration of solids in the initial feed suspension. As a general rule, however, we have found that a stabilizing zone having three-fourths the length of the heat exchange zone will operate satisfactorily and will provide an ample design safety factor.

Whereas we have described a heat exchange system involving the use of only one solids transport conduit, it is to be emphasized that this invention will work equally well with multiple conduits in either or both the heat exchange chamber and the stabilizing chamber.

*Example*

In actual experimental operation, the concept of this invention was utilized for recovering sensible heat from hot sand.

The apparatus employed comprised a heat exchanging chamber comprising an inner solids transport conduit or riser having an internal diameter of 2.05 inches and an overall length of 9 feet. Surrounding this riser was a jacket so constructed as to leave a space between the jacket walls and the walls of the riser. A water inlet was provided at the bottom of the jacket and a water outlet was provided at the top of the jacket.

A stabilizing chamber was provided directly above and connected with the heat exchange chamber in such a manner that the riser through the heat exchange chamber and the stabilizing chamber was a substantially continuous conduit. The inside diameter of the riser in the stabilizing chamber was also 2.05 inches and the riser in this chamber was 2½ feet in length. Surrounding the riser and stabilizing chamber was a layer of insulation so as to make the chamber substantially non heat-transferring and isothermal. A discharge was provided at the top of the stabilizing chamber for the purpose of discharging cooled solids and gases.

Sand of an average particle size to substantially pass through a 35 Tyler mesh screen and be retained on a 325 Tyler mesh screen was the solid material employed. This sand was heated and then suspended in an uprising stream of carrier gas to yield a resulting gas solids suspension having a temperature of approximately 824° F. This suspension was fed into the heat exchanger at such a rate that 928 pounds of solids per hour were fed to the heat exchange chamber along with 37.2 pounds of air per hour. Water was introduced into the water jacket at a rate of 774 pounds per hour and the same quantity was withdrawn. The water had an inlet temperature of 104° F. and an outlet temperature of 185.9° F.

After equilibrium was established, solids were discharged from the stabilizing chamber at a rate of 928 pounds per hour and at a temperature of 545° F.

Under these conditions heat was extracted from the gas solids suspension by the water at the rate of 63,100 B. t. u.'s per hour.

During operation of the actual concentration of solids, in the vertical riser was measured and was found to be 4.71 pounds of solids per cubic foot of gas solids suspension in the riser. This is to be contrasted with a concentration of approximately 1.7 pounds per cubic foot of suspension which would normally be expected to exist in the riser under the specified operating conditions. After equilibrium had been attained, operation of the heat exchanger was uniform. Solids were discharged from the stabilizing chamber at a uniform rate substantially equal to the rate at which they were supplied to the heat exchange chamber. Moreover, the discharged solids maintained a uniform temperature, so that they could be readily used as temperature control means by recirculation to a fluidized solids reactor so as to depress temperature within such reactor and thus maintain the reactor within the desired temperature limits.

We claim:

1. The continuous method for abstracting sensible heat from a hot gas-solids suspension, which comprises passing such suspension upwardly through a substantially vertical heat exchange chamber maintained in indirect heat exchange relationship with an everchanging coolant mass, and directly passing thus cooled gas-solids suspension from the heat exchange chamber upwardly into and through a substantially vertical stabilizing chamber maintained under substantially non-heat exchanging conditions while controlling the period of detention of the cooled suspension under the latter conditions to be sufficient for the cooled solids to discharge from the stabilizing chamber at a rate substantially equal to the rate of hot solids supply to the heat exchange chamber.

2. Apparatus of the class described comprising a vertical heat exchange chamber including an open-ended vertical solids transport conduit surrounded by a closed jacket, said jacket being spaced from the conduit walls so as to provide an enclosed space between solids transport conduit and the jacket walls, valved conduit means for admitting coolant to one end of the enclosed space, and conduit means for discharging coolant from the other end of the jacket; and a heat insulated stabilizing chamber directly superjacent to the heat exchange chamber and communicating with the open-ended solids transport conduit of the heat exchange chamber so as to form a substantially continuous conduit extending through both chambers said stabilizing chamber being of sufficient length that gases with suspended solids passing therethrough attain substantial thermal homogeneity prior to discharge therefrom, and conduit means for discharging gases and solids from the stabilizing chamber.

3. The continuous method for abstracting sensible heat from hot solids suspended in an uprising carrier gas stream, which comprises passing such suspension upwardly through a substantially vertical heat exchange zone maintained in indirect heat exchange relationship with an everchanging coolant mass, passing cooled suspension from the heat exchange zone directly upwardly into a superjacent isothermal zone, retaining the suspension in the latter zone until it attains thermal homogeneity, and discharging the thermally homogeneous suspension from the isothermal zone.

References Cited in the file of this patent

UNITED STATES PATENTS

| | | |
|---|---|---|
| 1,918,966 | Harkness | July 18, 1933 |
| 2,277,073 | Colbert | Mar. 24, 1942 |
| 2,493,911 | Brandt | Jan. 10, 1950 |
| 2,498,710 | Roetheli | Feb. 28, 1950 |